Nov. 7, 1933.                C. W. WATSON                1,933,574
                         TREATING HYDROCARBON OIL
                 Original Filed April 7, 1928    2 Sheets-Sheet 1
FIG. I.
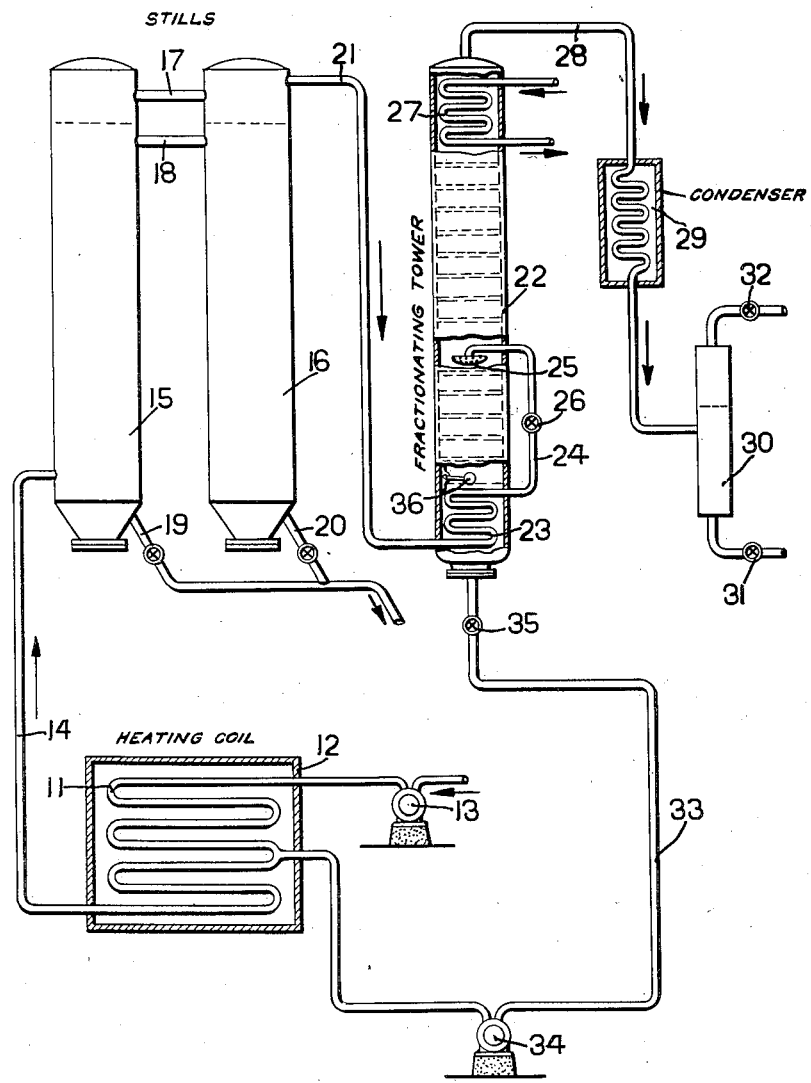

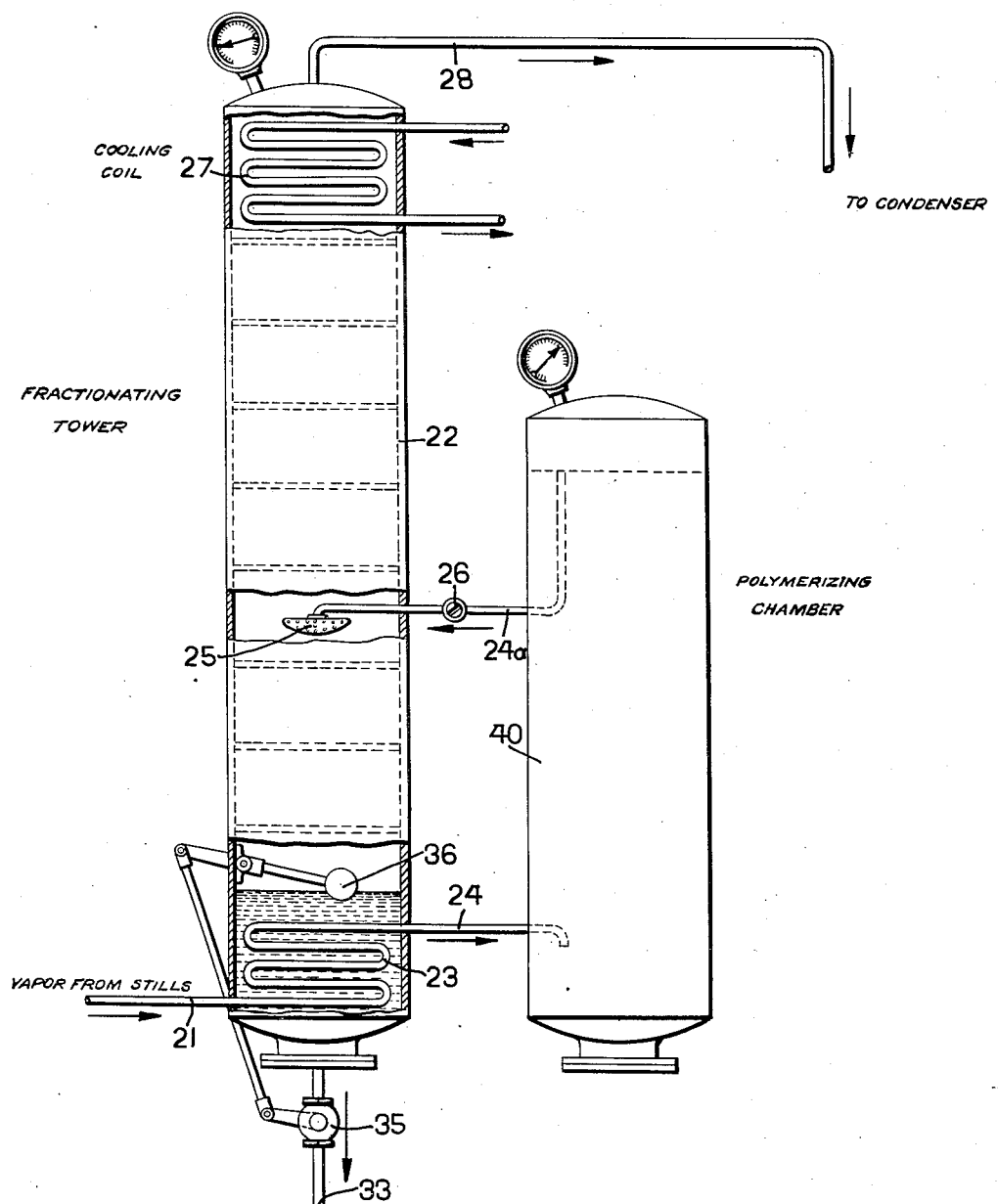

Patented Nov. 7, 1933

1,933,574

UNITED STATES PATENT OFFICE 1,933,574

TREATING HYDROCARBON OIL

Claude W. Watson, Port Arthur, Tex., assignor to The Texas Company, New York, N. Y., a corporation of Delaware Application April 7, 1928, Serial No. 268,245
Renewed December 13, 1932

11 Claims. (Cl. 196—139)

This invention relates to a method of treating hydrocarbon oil and has special reference to the fractional distillation of vapors evolved in the conversion of higher boiling hydrocarbon oil into lower boiling hydrocarbon oil. In the present invention the vapors of hydrocarbon oil are introduced into a fractionating tower, the vapors first passing, while under superatmospheric pressure, in heat exchange relation with liquid condensate collected in the lower portion of the fractionating tower, and are then expanded into the tower maintained under a lower pressure. The oil vapors, before being expanded into the fractionating tower, may pass thru a chamber maintained under pressure wherein stabilization of the more unstable hydrocarbon constituents may take place.

The invention is particularly applicable, although not limited, to that type of process for converting higher boiling hydrocarbon oil into lower boiling hydrocarbon oil in which the oil is first heated to a cracking temperature in the coil and then introduced into a still or reaction vessel wherein decomposition takes place, the vapors evolved from the still being conducted to a fractionating tower wherein the more volatile portion passes overhead while the less volatile portion is condensed and is returned to the heating coil.

The invention may be readily understood from a consideration of a description of the process in connection with the accompanying drawings.

In the drawings, Figure 1 illustrates in diagrammatic sectional elevation an apparatus for cracking or converting hydrocarbon oil which is within the invention.

Figure 2 illustrates apparatus, also in diagrammatic sectional elevation, by which a modification of a process comprising the invention may be practiced.

Referring to Figure 1 of the drawings, there is shown a typical unit for cracking hydrocarbon oil consisting of a heating coil 11 surrounded by a furnace 12. A charging pump 13 is provided for forcing the oil charge thru the coil 11 and thence thru the charging line 14 into the still 15. The two cracking stills 15 and 16 are connected together by means of a vapor line 17 and a liquid flow line 18 at their upper ends. Connections 19 and 20 are provided at the lower ends of the stills whereby the contents may be withdrawn if desired.

From the vapor portion of the still 16 a vapor line 21 leads to the fractionating tower 22, connecting directly to the coil 23 situated in the lower portion of the tower 22. The coil 23 is in turn connected to the line 24 which enters the tower 22 at a mid-point, terminating in the distributer 25 within the tower shell. A valve 26 is placed in the line 24 between the coil 23 and the point at which the line enters the still.

In the upper portion of the fractionating tower 22 there is provided a cooling coil 27 for the purpose of providing reflux cooling to the tower. A vapor line 28 leads from the top of the tower 22 to the condenser 29 which is in turn connected to the receiving drum 30, fitted with connections whereby condensate may be withdrawn thru the valve 31 and gaseous products thru the valve 32.

From the bottom of the tower 22 a line 33 leads to the hot oil pump 34 whereby condensate collecting in the bottom of the tower may be forced to the heating coil 11. A valve 35 is situated in the line 33 and is operated thru a suitable linkage by means of the float 36 fitted in the lower portion of the tower 22 whereby a pool of liquid condensate may be maintained in the tower.

The operation of the process in connection with the apparatus shown in Figure 1 may be substantially as follows:

The oil to be cracked, which is ordinarily referred to as charging stock and which may, for example, consist of a gas oil fraction of petroleum, is forced by the pump 13 from a source (not shown) thru the heating coil 11, wherein it is heated to a cracking temperature, which may be for example about 850° F. The oil then enters the bottom of the still 15 and passing therethru overflows thru the line 18 into the still 16. Additional heat may be supplied to the stills by suitable means such as a surrounding furnace (not shown) and the oil in the stills is maintained at a suitable cracking temperature, say for example about 810° F. and under a suitable pressure which may be 400 pounds per square inch. Conversion of the oil takes place rapidly in the stills, the low boiling products of the reaction being immediately vaporized and passing off thru the vapor line 21, while the higher boiling products of the reaction may be withdrawn continuously or periodically thru the lines 19 and 20.

The vapors evolved from the stills 15 and 16 will normally consist of a greater portion of the hydrocarbons produced during the cracking reaction which boil within the boiling range of ordinary gasoline. However, in addition to these fractions a large quantity of somewhat higher boiling material of the range of kerosene and light gas oil will also be evolved as vapor.

The vapors evolved from the stills pass thru the vapor line 21, thru the coil 23, the line 24, the valve 26 and finally issue from the distributer 25 into the fractionating tower 22 wherein fractional distillation of vapors takes place. The valve 26 is so manipulated that a substantially higher pressure will be maintained in the coil 23 than is maintained in the tower 22. For example, a pressure of 50 pounds per square inch may be maintained within the tower 22 with a pressure of 400 pounds per square inch in the coil 23. In general, it may be said that the pressure differential between the coil 23 and the tower 22 should be of the order of at least 50 pounds per square inch and, ordinarily, in excess of 100 pounds per square inch.

The vapors from the distributer 25 pass upward thru the fractionating tower 22 and are cooled by coming in contact with the cooling coil 27 thru which a suitable cooling fluid may be circulated. If desired, other suitable means may be supplied for cooling the top of the tower 22, such for example as the direct introduction therein of a suitable low boiling hydrocarbon fraction. Due to the cooling supplied at the top of the tower a portion of the vapors are condensed and, passing down thru the tower, collect in a pool in the lower portion thereof from which the condensate is returned thru the line 33 by means of a pump 34 to the heating coil 11 for further heating and conversion. The float 36, thru suitable connection with the valve 35, may maintain the desired liquid level in the pool of condensate collected in the lower portion of the tower 22. The vapors passing overhead from the tower 22 thru the line 28 are condensed and cooled in the condenser 29 and are collected in the receiving drum 30.

The operation as described has a very distinct advantage over the normal operation of a fractionating tower in connection with cracking apparatus in that a very complete separation of the hydrocarbons comprising the vapor introduced into the fractionating tower is accomplished. For example, under ordinary conditions where the vapors are introduced directly into the lower portion of the fractionating tower, which may or may not be maintained under the elevated pressure existing in the stills, the condensate collecting in the lower portion of the tower will be in equilibrium with the vapors entering the tower and will accordingly contain a very appreciable quantity of the more volatile hydrocarbons which should be distilled off from the top of the tower. It is, of course, uneconomical to recirculate these lower boiling fractions to the heating coil and stills.

By the practice of the invention as described, the vapors before entering the tower first pass thru the coil 23 immersed in the pool of liquid condensate collected in the bottom of the tower. While passing thru the coil the vapors, which are under superatmospheric pressure, give up a large portion of their heat to the liquid condensate, thus boiling out of this condensate the lower boiling constituents and allowing them to distill over the top of the tower to the condenser where they may be collected as a gasoline fraction. The vapors, having given up a portion of their heat to the condensate in the bottom of the tower, then expand thru the valve 26 into the tower wherein they are fractionated, the more volatile portions passing upward thru the tower, while the less volatile portions join the pool of condensate in the bottom of the tower and are accordingly returned by the pump 34 to the heating coil. By this means vapors may be taken overhead from the top of the tower which will come within the boiling range of ordinary merchantable gasoline, while the heavier material returned to the coil and stills for further conversion may be so stripped as to contain substantially no material boiling within the gasoline range.

In the apparatus illustrated in Figure 2 of the drawings, which constitutes one modification of the invention, there is shown a fractionating tower 22 similar in substantially all respects to the fractionating tower illustrated in Figure 1 and, in the two figures of the drawings, like reference numerals denote like and corresponding parts of the apparatus. In the modified apparatus illustrated in Figure 2 a vessel or chamber 40 is connected in the line 24 between the coil 23 and the valve 26. This vessel, which may be referred to as a polymerizing chamber, is of such heavy construction as to withstand the high pressures of several hundred pounds per square inch ordinarily encountered in cracking apparatus and may be of a liquid capacity substantially equal to the volume of condensate obtained overhead from the tower over a period of about one hour.

In the preferred method of operation in connection with the modified apparatus shown in Figure 2, the vapors evolved from the stills pass from the vapor line 21, thru the coil 23, and thence by the line 24 into the polymerizing chamber 40. During their passage thru the coil 23 the vapors give up a portion of their heat to the pool of liquid condensate in the bottom of the tower in which the coil is immersed and are themselves partially condensed. The chamber 40 is maintained under pressure preferably equal to that of the stills which, for the purpose of illustration, may be about 400 pounds per square inch. Passing thru the chamber 40 both vapor and condensate are continuously withdrawn from the upper portion thereof, thru the line 24a, and are introduced into the tower at an intermediate point thru the distributer 25, as described in the discussion of the apparatus shown in Figure 1.

Pressure is released thru the valve 26 to such an extent that a substantially lower pressure is maintained in the fractionating tower than in the polymerizing chamber. For example, a pressure of 400 pounds per square inch may be maintained in the chamber 40 and 50 pounds per square inch in the fractionating tower 22. The chamber 40 is preferably heavily insulated to minimize loss of heat by the contents and, if desired, may be so fitted as to receive additional heat from a suitable source such as a surrounding furnace.

The advantages derived from the use of the polymerizing chamber in connection with the remainder of the apparatus are apparent from a consideration of the character of the vapors evolved from the cracking stills. The gasoline fraction of these vapors contains certain highly unstable constituents of the nature of diolefins which, if allowed to remain in the gasoline fraction, form gums and also render the gasoline susceptible to darkening in color. It happens that such extremely unstable constituents will readily polymerize under conditions of high temperature and pressure, existing over a suitable period of time, to form higher boiling polymers which may be separated from the gasoline fraction of the vapors by fractional distillation. In the operation of the usual type of cracking unit in which a fractionating tower of the type known as a bubble tower is employed, the tower may be maintained under the same elevated pressure which is maintained in the cracking zone and, accordingly, at quite a high temperature, which may range from about 800° F. at the lower end to about 450° to 600° F. at the upper end. Such conditions of pressure and temperature have a stabilizing or polymerizing effect upon the vapors passing therethru, tending to polymerize and condense the relatively unstable volatile constituents.

However, when the fractionating tower or bubble tower of the cracking apparatus is operated under reduced pressure, as in the present invention, the stabilizing effect therein may be appreciably reduced due to the lower temperatures maintained and the shorter time in which the vapors are exposed to these temperatures. Accordingly, the polymerizing chamber is introduced in the path of vapors before entry into the fractionating tower. In this chamber the material vaporized from the stills is maintained for a suitable time under conditions of heat and pressure favorable for the accomplishment of polymerization and stabilization of the gasoline constituents thereof and by this means a relatively stable gasoline fraction may be produced, even though the fractionating tower be operated at a comparatively low pressure.

Obviously many modifications and variations of the invention, as hereinbefore set forth, may be made without departing from the spirit and scope thereof, and therefore, only such limitations should be imposed as are indicated in the appended claims.

I claim:

1. In the conversion of higher boiling hydrocarbon oils into lower boiling ones, the process that comprises subjecting the oil to cracking and vaporization by the application of heat under superatmospheric pressure, subjecting evolved vapors to cooling to effect partial condensation, passing the resultant cooled fluids while still at an elevated temperature to a separate polymerizing chamber and subjecting them to digestion therein under superatmospheric pressure and at the elevated temperature to thereby effect polymerization and stabilization of hydrocarbon constituents, expanding the resultant products, including polymerized liquids, into a fractionating tower and subjecting them to fractionation therein under reduced pressure to form a vapor fraction and a reflux condensate, supplying heat to reboil said reflux condensate and condensing the vapor fraction to form a final stabilized distillate.

2. In the conversion of higher boiling hydrocarbon oils into lower boiling ones, the process that comprises subjecting the oil to cracking and vaporization by the application of heat under superatmospheric pressure, passing evolved vapors to a separate polymerizing chamber and subjecting the hydrocarbons to digestion therein at elevated temperature under superatmospheric pressure to thereby effect polymerization and stabilization of hydrocarbon constituents, expanding the resultant products from the polymerizing chamber into a fractionating tower and subjecting them to fractionation therein under reduced pressure to form a vapor fraction and a reflux condensate, heating said reflux condensate by indirect contact with said evolved vapors, prior to their passage to said chamber, and condensing the vapor fraction to form a final stabilized distillate.

3. In the conversion of higher boiling hydrocarbon oils into lower boiling ones wherein vapors evolved in a pressure cracking still are passed to a fractionating tower for fractionation, the process that comprises subjecting the vapors in transit to the fractionating tower to cooling by indirect contact with the reflux condensate of said tower, to effect partial condensation, and permitting condensate to collect in a separate chamber wherein liquid and vapor constituents are held at approximately the pressure of the cracking still and at an elevated temperature less than that of said still, to effect polymerization and stabilization of hydrocarbon constituents, passing commingled vapor and liquid constituents to the fractionating tower and subjecting them to fractionation therein to form a vapor fraction and a reflux condensate and condensing the vapor fraction to form a final stabilized distillate.

4. In the conversion of higher boiling hydrocarbon oils into lower boiling ones, the process that comprises subjecting the oil to cracking and vaporization by the application of heat under superatmospheric pressure, subjecting evolved vapors to cooling to effect partial condensation, passing the resultant cooled fluids while still at an elevated temperature to a separate polymerizing chamber and subjecting them to digestion therein under superatmospheric pressure and at the elevated temperature to thereby effect polymerization and stabilization of hydrocarbon constituents, expanding the resultant products including polymerized liquids into a fractionating tower and subjecting them to fractionation therein under reduced pressure to form a vapor fraction and a reflux condensate, heating said reflux condensate by indirect contact with said evolved vapors prior to their passage to said chamber to effect said cooling and condensing the vapor fraction to form a final stabilized distillate.

5. The method of producing a relatively stable low boiling hydrocarbon distillate product which comprises subjecting a higher boiling hydrocarbon oil to cracking conditions of temperature and pressure, withdrawing cracked vaporous products, materially cooling said vaporous products to a polymerizing and stabilizing temperature below the cracking temperature, thereafter maintaining said cracked products in an enlarged zone for an extended period of time at said temperature and under a pressure of several hundred pounds while avoiding any substantial cooling of said products, thereby polymerizing and stabilizing hydrocarbon constituents thereof, thereafter discharging substantially all of the products from said enlarged zone into a fractionating zone, fractionating them in said zone to form a vapor fraction and a reflux condensate, heating said reflux condensate by indirect contact with said vaporous products prior to their passage to said enlarged zone to effect said cooling, withdrawing the fractionated vapors from said fractionating zone and condensing them to form the desired stable low boiling distillate product.

6. The method of producing a relatively stable low boiling hydrocarbon distillate product which comprises subjecting a higher boiling hydrocarbon oil to cracking conditions of temperature and pressure, separately withdrawing cracked vaporous products, materially cooling said vaporous products to a polymerizing and stabilizing temperature below the cracking temperature, thereafter maintaining said cracked products in an enlarged zone for an extended period of time at said temperature and under a pressure of several hundred pounds while avoiding any substantial cooling of said products, thereby polymerizing and stabilizing hydrocarbon constituents thereof, thereafter discharging substantially all of the products from said enlarged zone into a fractionating zone, fractionating them in said zone to form a vapor fraction and a reflux condensate, heating said reflux condensate by indirect contact with said vaporous products prior to their passage to said enlarged zone to effect said cooling, withdrawing the fractionated vapors from said fractionating zone and condensing them to form the desired stable low boiling distillate product.

7. The method of producing a relatively stable low boiling hydrocarbon distillate product which comprises subjecting a higher boiling hydrocarbon oil to cracking conditions of temperature and pressure, withdrawing cracked vaporous products, materially cooling said vaporous products to a polymerizing and stabilizing temperature below the cracking temperature and at which portions thereof condense under superatmospheric pressure of several hundred pounds, thereafter maintaining said cracked products in an enlarged zone for an extended period of time at said temperature and under a pressure of several hundred pounds while avoiding any substantial cooling of said products, thereby polymerizing and stabilizing hydrocarbon constituents thereof, thereafter discharging substantially all of the products from said enlarged zone into a fractionating zone, fractionating them in said zone to form a vapor fraction and a reflux condensate, heating said reflux condensate by indirect contact with said vaporous products prior to their passage to said enlarged zone to effect said cooling, withdrawing the fractionated vapors from said fractionating zone and condensing them to form the desired stable low boiling distillate product.

8. The method of producing a relatively stable low boiling hydrocarbon distillate product which comprises subjecting a higher boiling hydrocarbon oil to cracking conditions of temperature and pressure, separately withdrawing cracked vaporous products, materially cooling said vaporous products to a polymerizing and stabilizing temperature below the cracking temperature and at which portions thereof condense under superatmospheric pressure of several hundred pounds, thereafter maintaining said cracked products in an enlarged zone for an extended period of time at said temperature and under a pressure of several hundred pounds while avoiding any substantial cooling of said products, thereby polymerizing and stabilizing hydrocarbon constituents thereof, thereafter discharging substantially all of the products from said enlarged zone into a fractionating zone, fractionating them in said zone to form a vapor fraction and a reflux condensate, heating said reflux condensate by indirect contact with said vaporous products prior to their passage to said enlarged zone to effect said cooling, withdrawing the fractionated vapors from said fractionating zone and condensing them to form the desired stable low boiling distillate product.

9. The method of producing a relatively stable low boiling hydrocarbon distillate product which comprises subjecting a higher boiling hydrocarbon oil to cracking conditions of temperature and pressure, separately withdrawing cracked vaporous products, materially cooling said vaporous products to a polymerizing and stabilizing temperature below the cracking temperature, thereafter maintaining said cracked products in an enlarged zone for an extended period of time at said temperature and under a pressure of several hundred pounds while avoiding any substantial cooling of said products, thereby polymerizing and stabilizing hydrocarbon constituents thereof, thereafter discharging substantially all of the products from said enlarged zone into a low pressure fractionating zone to form a vapor fraction and a reflux condensate, heating said reflux condensate by indirect contact with said vaporous products prior to their passage to said enlarged zone to effect said cooling, fractionating them in said zone, withdrawing the fractionated vapors from said fractionating zone and condensing them to form the desired stable low boiling distillate product.

10. The method of producing a relatively stable low boiling hydrocarbon distillate product which comprises subjecting a higher boiling hydrocarbon oil to a cracking temperature under a superatmospheric pressure of several hundred pounds, separately withdrawing cracked vaporous products, maintaining said vaporous products under said pressure and cooling them to a polymerizing and stabilizing temperature substantially below said cracking temperature, thereafter maintaining the said cracked products in an enlarged zone for an extended period of time without effecting substantial cooling thereof or reduction in pressure thereon, thereby polymerizing and stabilizing hydrocarbon constituents thereof, thereafter discharging substantially all of the products from said enlarged zone into a fractionating zone, fractionating them in said zone to form a vapor fraction and a reflux condensate, heating said reflux condensate by indirect contact with said vaporous products prior to their passage to said enlarged zone to effect said cooling, withdrawing the fractionated vapors from said fractionating operation and condensing them to form the desired stable low boiling distillate product.

11. The method of producing a relatively stable low boiling hydrocarbon distillate product which comprises subjecting a higher boiling hydrocarbon oil to a cracking temperature under a superatmospheric pressure of several hundred pounds, separately withdrawing cracked vaporous products, maintaining said vaporous products under said pressure and cooling them to a polymerizing and stabilizing temperature substantially below said cracking temperature and at which portions thereof condense under said pressure, thereafter maintaining the said cracked products in an enlarged zone for an extended period of time without effecting substantial cooling thereof or reduction in pressure thereon, thereby polymerizing and stabilizing hydrocarbon constituents thereof, thereafter discharging substantially all of the products from said enlarged zone into a fractionating zone, fractionating them in said zone to form a vapor condensate, heating said reflux condensate by indirect contact with said vaporous products prior to their passage to said enlarged zone to effect said cooling, withdrawing the fractionated vapors from said fractionating operation and condensing them to form the desired stable low boiling distillate product.

CLAUDE W. WATSON.